United States Patent [19]

Katz

[11] 4,113,886

[45] Sep. 12, 1978

[54] MEMBRANE DECAFFEINATION

[75] Inventor: Saul Norman Katz, Monsey, N.Y.

[73] Assignee: General Foods Corporation, White Plains, N.Y.

[21] Appl. No.: 837,349

[22] Filed: Sep. 28, 1977

[51] Int. Cl.² .............................................. A23F 1/10
[52] U.S. Cl. .................................. 426/422; 426/424; 426/427; 426/428; 426/490; 544/275; 210/22 R
[58] Field of Search ............. 426/490, 427, 428, 424, 426/422; 260/256; 210/22, 321 A

[56] References Cited

U.S. PATENT DOCUMENTS

| 2,309,092 | 1/1943 | Berry et al. | 426/424 |
| 3,956,112 | 5/1976 | Lee et al. | 210/22 C |
| 3,989,466 | 11/1976 | Pan | 260/256 X |

*Primary Examiner*—Joseph M. Golian
*Attorney, Agent, or Firm*—Thomas R. Savoie; Daniel J. Donovan

[57] ABSTRACT

Aqueous vegetable extracts such as extracts of tea or green or roasted coffee are decaffeinated by permitting caffeine to diffuse through at least one porous, hydrophilic membrane and a water-immiscible solvent phase and into a water phase. The solvent may be either internal to a single membrane or positioned between two spaced-apart membranes.

7 Claims, No Drawings

MEMBRANE DECAFFEINATION

BACKGROUND OF THE INVENTION

Current commercial decaffeination of coffee is effected by the removal of caffeine from whole, green coffee beans. The beans are first moistened and then extracted with a solvent which is relatively specific for caffeine. The solvents employed commercially are either a chlorinated hydrocarbon solvent, such as discussed in U.S. Pat. No. 3,671,263 to Patel et al. or a caffeine-deficient water solution of green coffee solubles, such as disclosed in U.S. Pat. No. 2,309,092 to Berry et al. which is herein incorporated by reference.

In the decaffeination process of U.S. Pat. No. 2,309,092 which is commonly referred to was the water extraction system (Note: Sivetz, *Coffee Processing Technology*, Vol. 2, p. 208, AVI Publishing Co., Inc., 1963) the caffeine laden water extract, resulting from contact between caffeine-containing green coffee and the caffeine-deficient water solution, is directly extracted with a solvent in order to remove caffeine. Typically these solvents are the same chlorinated hydrocarbons which are employed in the direct solvent extraction processes, exemplified by the aforementioned U.S. Pat. No. 3,671,263.

It is also known to produce decaffeinated soluble coffee by first stripping and collecting volatile flavor and aromas from an aqueous extract of roasted coffee and then directly contacting the stripped extract with an organic water-immiscible caffeine solvent such as methylene chloride. The decaffeinated extract can then be combined with the collected volatiles and dried to a soluble powder form. Such a process is described in U.S. Pat. No. 2,933,395 to Adler et al. A process of this type could also be applied to aqueous tea extracts.

The coffee industry is desirous of finding systems for decaffeination which will avoid intimate contact (e.g., as in liquid-liquid extraction) between the aqueous extract to be decaffeinated and an organic solvent. Additionally, it would be desirable if these new decaffeination techniques would reasonably permit the use of non-halogenated solvents which might have a relatively low (i.e., much below that of halogenated hydrocarbons) partition coefficient for caffeine. Such materials as liquid triglycerides (e.g., vegetable oils), fatty acids and fatty alcohols are among these low-capacity caffeine solvents which have a desirably high degree of toxicological safety; however, because of the large amounts of these materials that would be required for their use in conventional extraction decaffeination process, they have not been used commercially.

Decaffeination techniques which avoid the use of a solvent such as the resin technique of U.S. Pat. No. 3,108,876 to Turken et al. and the microbiological technique of U.S. Pat. No. 3,749,584 to Kurtzman et al. are known to the art but have not yet been developed commercially. The use of membrane technology such as in dialysis, ultrafiltration and reverse osmosis has not proven to be successful since presently available membranes are not capable of removing virtually all the caffeine from the aqueous extracts without also removing large amounts of non-caffeine coffee solids. The use of membrane solvent extraction techniques, such as described in U.S. Pat. No. 3,956,112 to Lee et al., would not prove practical for the commercial decaffeination of coffee or tea extracts since the swollen, non-porous membranes used in this process will not permit sufficiently high rates of caffeine diffusion from the extract to the solvent, such that virtually all the caffeine is removed from the extract in a reasonable time period.

SUMMARY OF THE INVENTION

The present invention is directed to a process for decaffeinating aqueous vegetable extracts such as the aqueous extracts of either green or roasted coffee or tea. The process of this invention makes use of a water-immiscible caffeine-selective solvent to transfer caffeine from the coffee or tea extract to a water phase from which the caffeine is ultimately removed. Direct contact between the coffee or tea extract and the solvent is avoided by means of one or more porous hydrophilic membranes which serve to retain and/or hold the water-immiscible solvent away from both the aqueous extract phase and the water phase.

This invention contemplates the use of a single, porous membrane wherein the membrane is filled with the solvent and this filled membrane is used to separate the two aqueous phases. The use of hollow fiber membranes would be particularly useful in this embodiment. Alternatively, two porous membranes may be employed, one membrane for separating the aqueous coffee or tea extract from the solvent and a second membrane or membrane section for separating the solvent from the water phase.

As will be apparent to those skilled in the art, this invention could be practiced in either a batch or continuous mode of operation. For most commercial applications, it is anticipated that continuous countercurrent operation will be most desirable.

DESCRIPTION OF THE INVENTION

An aqueous coffee or tea extract typically having a soluble solids concentration of 10% to 35% by weight, most typically about 15% to 28% is passed or held on one side of a thin porous membrane which is either filled with or used to separate a liquid, water-immiscible solvent which is relatively specific for caffeine. A water phase, which may be either pure water or water containing molecules of sufficiently high molecular weight to be retained by the membrane, is passed or placed either on the opposite side of the solvent-filled membrane or on the opposite side of a second porous membrane used to separate the solvent from the water phase.

The water-immiscible liquid solvents useful in this invention are preferably edible materials especially those materials which do not possess significant flavor notes which are incompatible with the vegetable extract being decaffeinated. It is necessary that the solvent be liquid at the temperature at which decaffeination is effected which will typically be within the range of 0° to 95° C and usually below about 70° C. It is not necessary that the solvent be liquid at room temperature; thus, such materials as fats, fatty acids and fatty alcohols which are solids at room temperature are within the scope of this invention. It will also be necessary that the solvent be compatible with the particular membrane or membranes employed in the decaffeination system.

As the solvent is merely the means for transferring caffeine from the extract to the water phase, it is not necessary that the solvent have either a high capacity for caffeine or a high partition coefficient for caffeine; these values may be as low as 0.5 (gms of caffeine/100 ml of solvent) and 0.05 (gms of caffeine in solvent/gms of caffeine in extract), respectively, at the temperature at which they are used. The comparable values for methylene chloride, presently the most widely used decaffeinating solvent, are 15.0 and 1.4, respectively, at about 60° C. Desirably, however, the caffeine specificity of the solvent expressed as (gms of non-caffeine solids/gms of caffeine) should be at least as good as methylene chloride which possesses a value of 0.2 for contact with an aqueous extract of green coffee beans.

Solvents which will be suitable for use in this invention include toluene, xylene, fatty acids such as oleic acid, lauric acid, stearic acid, octanoic acid, fatty alcohols such as stearyl alcohol, triglycerides such as safflower oil, soybean oil, corn oil and coffee oil.

As the solvent is the selective caffeine transfer device, the purpose of the membrane is to separate the extract and solvent phases and the water and solvent phases. These membranes should therefore be as loose and open and offer as little resistance as possible. Suitable membranes include semi-permeable dialysis films of cellulosic, proteinaceous or synthetic organic polymeric materials having the ability to permit passage of molecules having a molecular weight of at least 5000.

The filled membranes useful in the process of this invention can be prepared from porous homogeneous membranes containing water ranging from about 70% to 99% by weight. The water-filled membrane is placed in one or more successive baths of a polar solvent such as a water miscible alcohol for periods totaling several hours in order to displace all of the water with polar solvent. The thus treated membrane is then placed in one or more baths of the desired inert, caffeine-specific solvent in order to displace all of the polar solvent.

As previously noted, the filled membrane may be in the form of a thin sheet typically on the order of 20 to 300 microns in thickness or in the form of hollow fibers having a wall thickness of comparable size. Permeable hollow fibers may be manufactured from textile grade resins by spinning from a solution of a polymer in a volatile solvent into an evaporative column. The tubular cross-section is formed by extruding the polymer solution through an annular dye or spinneret. The pore size and pore distribution within the fiber walls can be controlled by selection of the solvent.

It will, of course, be necessary in commercial operation to remove caffeine from the water phase so that this water may be recycled and that caffeine is recovered as a valuable by-product. Caffeine can be removed from water either continuously or in batch operation. Such known techniques as the use of hydrophobic adsorption resins, reverse osmosis or direct crystallization from the concentrated water phase may be employed.

This invention is further described but not limited by the following Examples.

EXAMPLE 1

An aqueous extract of green coffee containing soluble solids at a level of 25% by weight and a caffeine concentration of 1% by weight was placed into a tube bent to assume a U-shape, the tubing cellophane dialysis membrane tubing having large (10,000 M.W.) openings. An amount of water equal to the volume of extract was placed in a second U-shaped tube of cellophane membrane. Both of the filled tubes were placed in a bath containing lauric acid having a volume four times that of the extract and maintained at 140° F. After three hours the extract was found to be 27% (by weight) decaffeinated with 81.4% of this removed caffeine being collected in the water-containing tube.

EXAMPLE 2

An ultramicroporous, homogeneous cellulosic membrane 100 microns thick and containing 91.7% water (Molecular Research Corp., Cambridge, Mass. 02142) was placed in a bath of methanol for two hours to replace the water in the membrane with alcohol. This step was repeated to eliminate all the water. The alcohol saturated membrane was then placed in a bath containing oleic acid; this step was also repeated to remove all residual alcohol. The solvent (oleic acid) filled membrane was then placed in a dialysis cell with an exposed area of 4 inches × 4 inches. Continuous flow through both sides of the cell was maintained for two hours at 110° F with 300 ml of an aqueous solution of green coffee solids (26.8% soluble solids, 0.745% caffeine) being circulated on one side of the membrane and 900 ml of distilled water saturated with oleic acid on the other side. Caffeine concentration in the coffee solution was reduced 22% with no reverse diffusion of water into the coffee solution or removal of non-caffeine solids from the coffee solution having occurred.

EXAMPLE 3

An oleic acid filled membrane was prepared as in Example 2 and placed in a dialysis cell with an exposed area of 4 inches × 4 inches. Continuous recycling flow of 300 mls of an aqueous solution of green coffee solids (26.8% soluble solids, 0.745% caffeine) with 10% by volume (30 mls) of methanol was effected on one side of the membrane and 900 mls of pure water saturated with oleic acid was recycled on the other side. After two hours at 140° F, 39.5% of the caffeine was removed from the extract. A maximum caffeine transfer rate was calculated as being 0.0167 lbs/hr-ft$^2$ compared to a value of 0.0076 lbs/hr-ft$^2$ for the system of Example 2.

As can be seen from Example 3, the caffeine transfer rate is significantly enhanced by the presence of a water-miscible alcohol such as methanol in the extract at about 5 to 20% by volume. The addition of the alcohol to the extract is believed to increase the solubility of caffeine in the membrane and/or transport caffeine with it through the membrane. Recovery of alcohol from the water phase as well as stripping residual alcohol from the extract may be effected by any one of several known techniques such as fractionation, steam stripping, etc.

Having thus described the invention, what is claimed is:

1. A method for decaffeinating an aqueous caffeine-containing solution comprising the steps of:
    (a) contacting one side of a porous, solvent-filled membrane with an aqueous, caffeine-containing solution, said solvent being a water-immiscible, caffeine-specific solvent comprising at least 70% by weight of the filled membrane,
    (b) contacting the opposite side of the membrane with a water phase,
    (c) maintaining the respective contacts for a sufficient period of time to reduce the caffeine concentration of the solution by permitting caffeine to pass through the filled membrane and into the water phase.

2. The method of claim 1 wherein the aqueous caffeine-containing solution is a coffee or tea extract.

3. The method of claim 2 wherein the extract is a green coffee extract.

4. The method of claim 2 wherein the extract is a roasted coffee extract which has been stripped of volatiles.

5. The method of claim 1 wherein the solvent is selected from the group consisting of fatty acids, fatty alcohols and triglycerides.

6. The method of claim 1 wherein from 5 to 20% by volume of a water-miscible alcohol is added to the caffeine-containing solution.

7. The method of claim 1 wherein the filled membrane is in the form of a hollow fiber.

* * * * *